United States Patent [19]

Kato et al.

[11] Patent Number: 4,738,159
[45] Date of Patent: Apr. 19, 1988

[54] FOUR-WHEEL DRIVE AUTOMATIC TRANSMISSION

[75] Inventors: Kozo Kato; Yoichi Hayakawa, both of Anjo; Yutaka Taga; Shinya Nakamura, both of Toyota, all of Japan

[73] Assignees: Aisin-Warner Ltd.; Toyota Motor Corp., both of Japan

[21] Appl. No.: 11,237

[22] Filed: Feb. 5, 1987

Related U.S. Application Data

[63] Continuation-in-part of Ser. No. 671,426, Nov. 14, 1984, abandoned.

[30] Foreign Application Priority Data

Nov. 14, 1983 [JP] Japan .............................. 58-214647

[51] Int. Cl.⁴ ............................................ F16H 57/02
[52] U.S. Cl. .................................... 74/606 R; 74/695
[58] Field of Search ......................... 74/606 R, 606 A; 210/222; 74/467, 695; 184/6.12, 6.3

[56] References Cited

U.S. PATENT DOCUMENTS

| | | | |
|---|---|---|---|
| 4,083,266 | 4/1978 | Kreitzberg | 74/606 R |
| 4,203,331 | 5/1980 | Shindo et al. | 74/606 R |
| 4,210,034 | 7/1980 | Younger | 74/606 R |
| 4,226,200 | 10/1980 | Morisawa et al. | 74/606 R |
| 4,261,227 | 4/1981 | Yamamori et al. | 74/606 R |
| 4,271,717 | 6/1981 | Millward et al. | 74/606 R |
| 4,365,523 | 12/1982 | Numazawa et al. | 74/606 R |
| 4,467,754 | 8/1984 | Hayashi et al. | 74/606 R |
| 4,526,054 | 7/1985 | Ehrlinger | 74/606 R |
| 4,539,865 | 9/1985 | Yoneda et al. | 74/606 R |

FOREIGN PATENT DOCUMENTS 0076156  4/1983  European Pat. Off. .......... 70/606 R Primary Examiner—Gary L. Smith
Assistant Examiner—Vinh Luong
Attorney, Agent, or Firm—Lorusso & Loud

[57] ABSTRACT

A four-wheel drive automatic transmission primarily consisting of an automatic transmission having a transmission case, a transmission gear mounted in the transmission case and an automatic transmission hydraulic control unit including a transmission valve body secured to the bottom surface of the transmission case; and a four-wheel drive transfer having a transfer case, a transfer unit mounted in the transfer case and a transfer hydraulic control unit including a transfer valve body secured to the bottom surface of the transfer case. The automatic transmission hydraulic control unit and the transfer hydraulic control unit communicate with each other by oil passages cast in the transmission case and in the transfer case.

1 Claim, 5 Drawing Sheets

4,738,159

FOUR-WHEEL DRIVE AUTOMATIC TRANSMISSION

CROSS-REFERENCE TO RELATED APPLICATION

This application is a continuation-in-part of our co-pending application U.S. Ser. No. 671,426 filed Nov. 14, 1984 now abandoned.

BACKGROUND OF THE INVENTION

The present invention relates to a construction of the oil passage of a four-wheel drive automatic transmission.

SUMMARY OF THE INVENTION

It is an object of the present invention to provide a four-wheel drive automatic transmission at a reduced cost, having a reduced number of parts, requiring less assembly work and capable of obviating malfunction of the automatic transmission due to any shortage of the working fluid.

In accordance with the present invention, there is provided a four-wheel drive automatic transmission including;

an automatic transmission having a transmission case, a transmission mechanism mounted in the transmission case, and an automatic transmission hydraulic control unit including a transmission valve body secured to the bottom surface of the transmission case; and a four-wheel drive transfer having a transfer case secured to the transmission case, a transfer mechanism mounted in the transfer case, and a transfer hydraulic control unit including a transfer valve body secured to the bottom surface of the transfer case; wherein the automatic transmission hydraulic control unit and the transfer hydraulic control unit communicate with each other by means of oil passages formed in the transmission case and in the transfer case.

Thus, according to the present invention, the connecting oil passages of the automatic transmission hydraulic control unit and the transfer hydraulic control unit are formed by casting holes in the cases. Accordingly, the four-wheel drive automatic transmission according to the present invention requires less machining processes, reduces the cost, is free from the potential for trouble in a pipe coming off, as neither pipes nor tubes are used. Thus, the invention obviates malfunction of the automatic transmission attributable to a shortage of the working fluid.

The foregoing and other objects, advantages and features of the present invention will be apparent from the following description of the preferred embodiments thereof taken in connection with the accompanying drawings.

DESCRIPTION OF THE PREFERRED EMBODIMENTS

Figure 1:
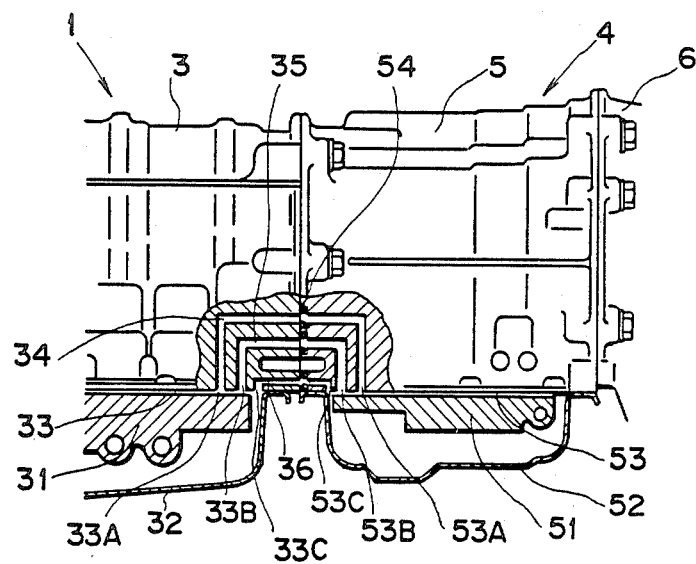
FIG. 1 is a front elevation, partly in section, of a four-wheel drive automatic transmission according to the present invention.

A four-wheel drive automatic transmission embodying the present invention will be described hereunder, first in connection with FIGS. 1 and 2.

A four-wheel drive automatic transmission 1 according to the present invention is housed in an automatic transmission case 4 having a fluid coupling case 2 and a transmission case 3, and a transfer case 9 having an extension case 5, a transfer case 6 through the lower portion of which a second output shaft 61 projects, a transfer cover 7 and an extension housing 8 through the rear end of which (the right end in FIG. 2) a first output shaft 71 projects. These cases are joined together by means of a plurality of bolts.

The fluid coupling case 2 houses a conventional torque converter or fluid coupling and an oil pump.

The transmission case 3 houses a planetary gear transmission mechanism including a planetary gear set, and a brake and a clutch which are controlled by a hydraulic servomechanism so as to fix a component of the planetary gear set to the transmission case or to connect the same to the input shaft, output shaft or other component. To the bottom surface of the transmission case 3, are secured (1) an automatic transmission valve body 31 internally provided with an automatic transmission hydraulic control unit which selectively supplies the working fluid to or drains the hydraulic servomechanisms of the clutch and the brake of the automatic transmission and (2) an automatic transmission oil pan 32 receiving the automatic transmission valve body 31.

The extension case 5 houses the clutch and the brake of the four-wheel drive transfer. To the bottom surface of the extension case 5, are secured a transfer valve body 51 internally provided with a transfer hydraulic control unit, which selectively supplies the working fluid to or drains the hydraulic servomechanisms of the brake and the clutch housed in the transfer case 9, and a transfer oil pan 52 receiving the transfer valve body 51 therein.

In this embodiment are formed, between the automatic transmission valve body 31 and the transfer valve body 51, a line pressure oil passage 34 and a governor pressure oil passage 35 for supplying the line pressure produced in the automatic transmission hydraulic control unit and the governor pressure corresponding to the revolution of the output shaft, respectively, to the transfer hydraulic control unit and a return oil passage 36 for returning the working fluid from the transfer oil pan 52 to the automatic transmission oil pan 32.

The line pressure oil passage 34 consists of a hole formed through the wall of the transmission case 3 by casting, an outlet port 33A formed in the upper wall 33 of the automatic transmission hydraulic control unit, a hole formed through the wall of the extension case 5 by casting, an inlet port 53A formed in the upper wall 53 of the transfer hydraulic control unit and an oil seal 54.

The governor pressure passage 35 consists of a hole formed through the wall of the transmission case 3 by casting, an outlet port 33B formed in the upper wall 33 of the automatic transmission hydraulic control unit, a hole formed in the wall of the extension case 5 by casting, an inlet port 53B formed in the upper wall 53 of the transfer hydraulic control unit and the oil seal 54.

The return oil passage 36 consists of a hole formed through the wall of the transmission case 3 by casting, an inlet port 33C formed in the upper wall 33 of the automatic transmission hydraulic control unit, a hole formed through the wall of the extension case 5 by casting, an outlet port 53C formed in the upper wall 53 of the transfer hydraulic control unit and the oil seal 54 placed at the junction of the transmission case 3 and the extension case 5.

In this embodiment, three connecting oil passages are provided, however, only one connecting oil passage need be provided.

Figure 2:
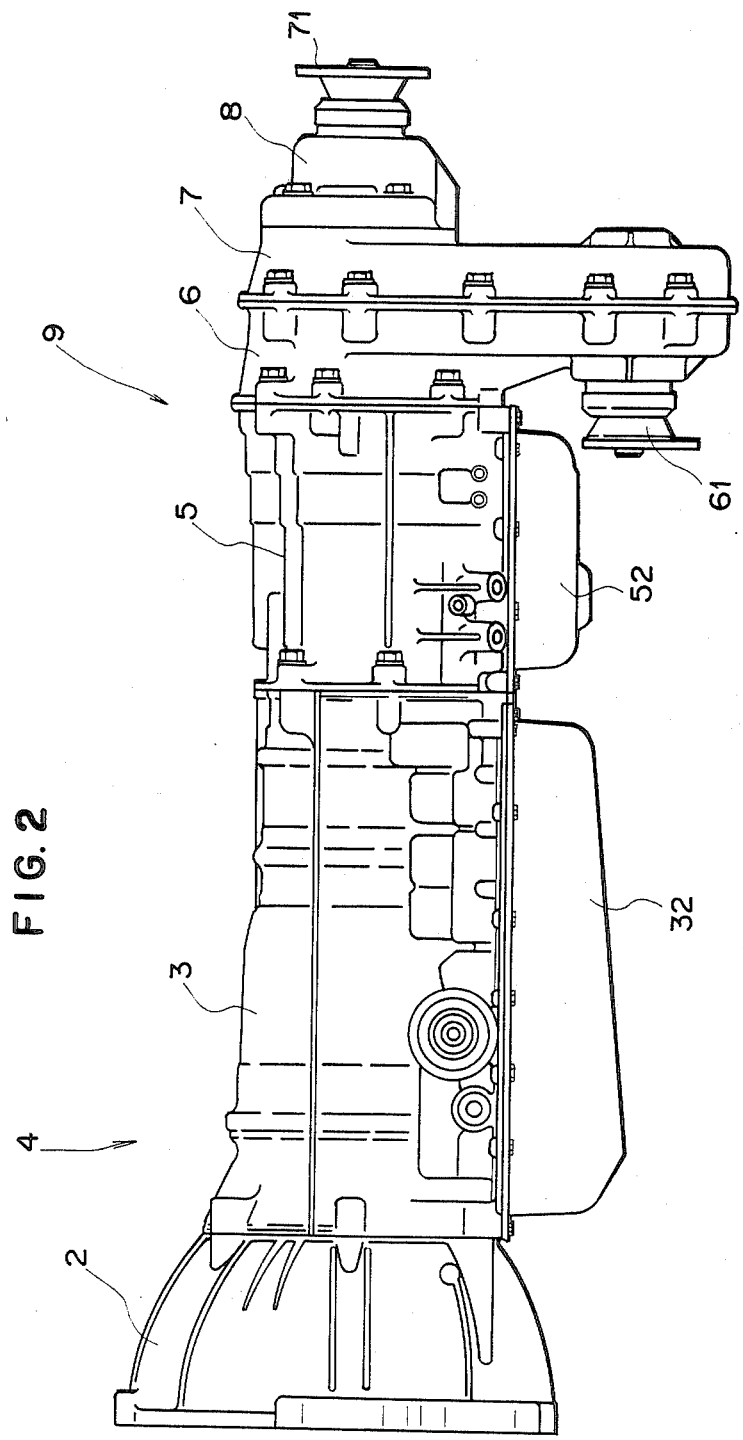
FIG. 2 is a front elevation of a combination of an automatic transmission case and a four-wheel drive transfer case employing a four-wheel drive automatic transmission in accordance with the present invention.
Figure 3:
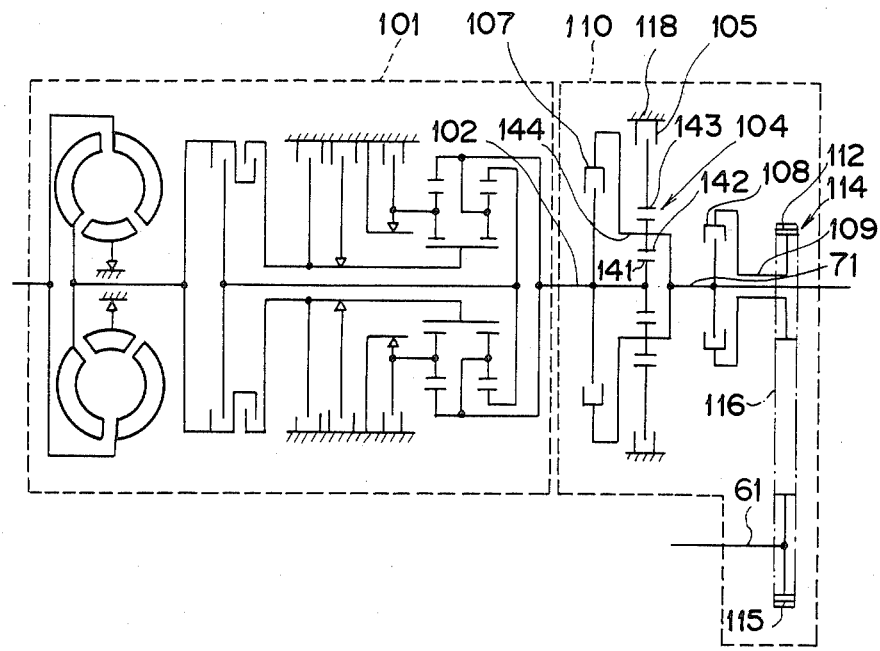
FIG. 3 is a skeletal view of an automatic transmission and a torque transfer mechanism for a vehicle which the present invention concerns.

With reference to FIG. 2, each of passages 34, 35 and 36 may be viewed as having two sections, i.e. a first section or flow passage extending through the interior of the transmission case and a second section or flow passage extending through the interior of the transfer case. These first and second flow passages connect at the planar interface between the mating end faces of the transmission and transfer unit housings.

Referring now to FIGS. 3 through 6, a four-wheel drive automatic transmission and hydraulic control units embodying the present invention will further be described.

Indicated at 101 is a transmission gear assembly of the automatic transmission and at 110 a torque transfer mechanism which is connected to the output end of the transmission gear assembly through a shaft 102 which serves as the output shaft of the transmission gear assembly 101 and at the same time as the input shaft of the torque transfer mechanism 110. Denoted at 71 is a first output shaft of the transfer mechanism 110, which is located behind the input shaft 102 in series therewith, at 210 a governor valve which is securely mounted on the input shaft 102, and at 104 a planetary gear set including a sun gear 141 which is secured by a spline on a rear portion of the input shaft 102, planetary pinions 142 in meshing engagement with the sun gear 141, a ring gear 143 in meshing engagement with the planetary pinions 142, and a carrier 144 rotatably retaining the planetary pinions 142 and coupled with the fore end of the first output shaft 71 of the transfer mechanism. Designated at 105 is a friction brake for engaging and disengaging the ring gear 143 with the transfer case 9 (See FIG. 2), and at 150 (FIG. 5) a hydraulic servomotor for the brake 105. The sun gear 141 and carrier 144 are coupled and uncoupled by a friction clutch 107 which is at one end of the planetary gear set 104 on the side of the transmission gear assembly. The reference numeral 170 indicates a hydraulic servomotor for the clutch 107. Denoted at 108 is a friction clutch for engaging and disengaging the first output shaft 71 and a sleeve 109 connected to one sprocket wheel 112 of a link mechanism which drives the other output shaft of the transfer mechanism as will be described hereinafter. The reference numeral 180 (FIG. 5) indicates a hydraulic servomotor for the clutch 108. Further designated at 61 is the second output shaft of the transfer mechanism, and at 114 a link mechanism which is constituted by the sprocket wheel 112 secured by a spline to the sleeve 109, a sprocket wheel 115 secured by a spline to the second output shaft 61, and a chain 116 lapped between and around the two sprocket wheels.

Figure 4:
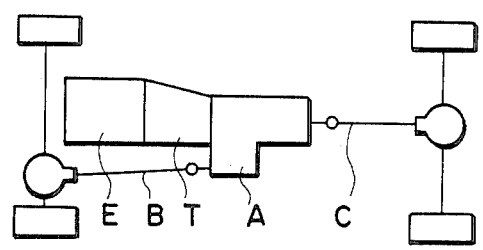
FIG. 4 is a schematic illustration of a power transmission system of motor vehicle.

As indicated at A in FIG. 4, the transfer mechanism is assembled with an automatic transmission T which is connected to an internal combustion engine E of a motor vehicle, with its first output shaft 71 connected to a rear wheel propeller shaft and the other or the second output shaft 61 to a front wheel propeller shaft B. In a normal cruising operation, the line pressure which is supplied to the hydraulic control circuit of the automatic transmission is fed to the hydraulic servomotor 170 (see FIG. 5) to engage the clutch 107, while the hydraulic servomotors 150 and 180 are drained to hold the brake 105 and clutch 108 in released state. Consequently, the sun gear 141 and carrier 144 of the planetary gear set 104 are coupled to transmit power to the first output shaft 71 from the input shaft 102 in a reduction ratio of 1 for operation in rear two-wheel drive. In this instance, the power from the input shaft 102 is transmitted to the first output shaft 71 from the carrier 144 through clutch 107, by-passing the gears 141 to 143 which therefore receive no load on their tooth faces and thereby have a prolonged service life. If it is desired to switch the mode of operation from two-wheel drive to four-wheel drive, a selector lever or switch which is provided in the driver's cabin is manipulated for manual shift, actuating the hydraulic control system 300 of the transfer mechanism whereupon the line pressure is supplied gradually to the hydraulic servomotor 180 to engage the clutch 108 smoothly. As a result, the first output shaft 71 is connected with the sleeve 109 to transmit the power also to the front wheels through the link mechanism 114, second output shaft 61 and propeller shaft B to operate the vehicle in the four-wheel drive mode transmitting the power of the input shaft 102 in a reduction ratio of 1 to the first output shaft 71 which drives the front wheels as well as to the second output shaft 61 which drives the rear wheels. If a greater output torque is required for hill climbing or other reasons during operation in the four-wheel drive mode, the oil pressure to the hydraulic servomotors actuates an inhibitor valve 340 and a check valve 420 to supply the line pressure gradually to the hydraulic servomotor 150 while draining the oil pressure of the hydraulic servomotor 170, thereby gradually engaging the brake 105 and at the same time releasing the clutch 107 smoothly. As a result, the sun gear 141 and carrier 144 are released and the ring gear 143 is held stationary, so that the rotation of the input shaft 102 is transmitted to the first and second output shafts 71 and 61 after reduction through the sun gear 141, planetary pinions 142 and carrier 144 to establish a four-wheel drive operation of a greater torque. Table 1 below shows the positions of the manual shift of the transfer mechanism in relation with the engaged or released states of the brake 105 and clutches 107 and 108 and the mode of operation.

TABLE 1

| Manual Shift | Mode of Operation | Frictional Engagement Means | | | Reduction Ratio |
|---|---|---|---|---|---|
| | | 105 | 107 | 108 | |
| H$_2$ range | Two-wheel drive | X | O | X | 1 |
| H$_4$ range | Four-wheel drive direct-coupling | X | O | O | 1 |
| L$_4$ range | Four-wheel drive direct-coupling | X | O | O | 1 |

TABLE 1-continued

| Manual Shift | Mode of Operation | Frictional Engagement Means | | | Reduction Ratio |
|---|---|---|---|---|---|
| | | 105 | 107 | 108 | |
| | Reduced-speed four-wheel drive | O | X | O | $\frac{1+\lambda}{\lambda} = 3.0$ |

In Table 1, the marks "O" and "X" indicate the engaged and released states of the frictional engagement means, respectively. The symbol "λ" in the reduction ratio represents the ratio in the number of teeth of the sun gear 141 to the ring gear 143, and is regarded as 0.5 in the example shown in Table 1.

Figure 5:
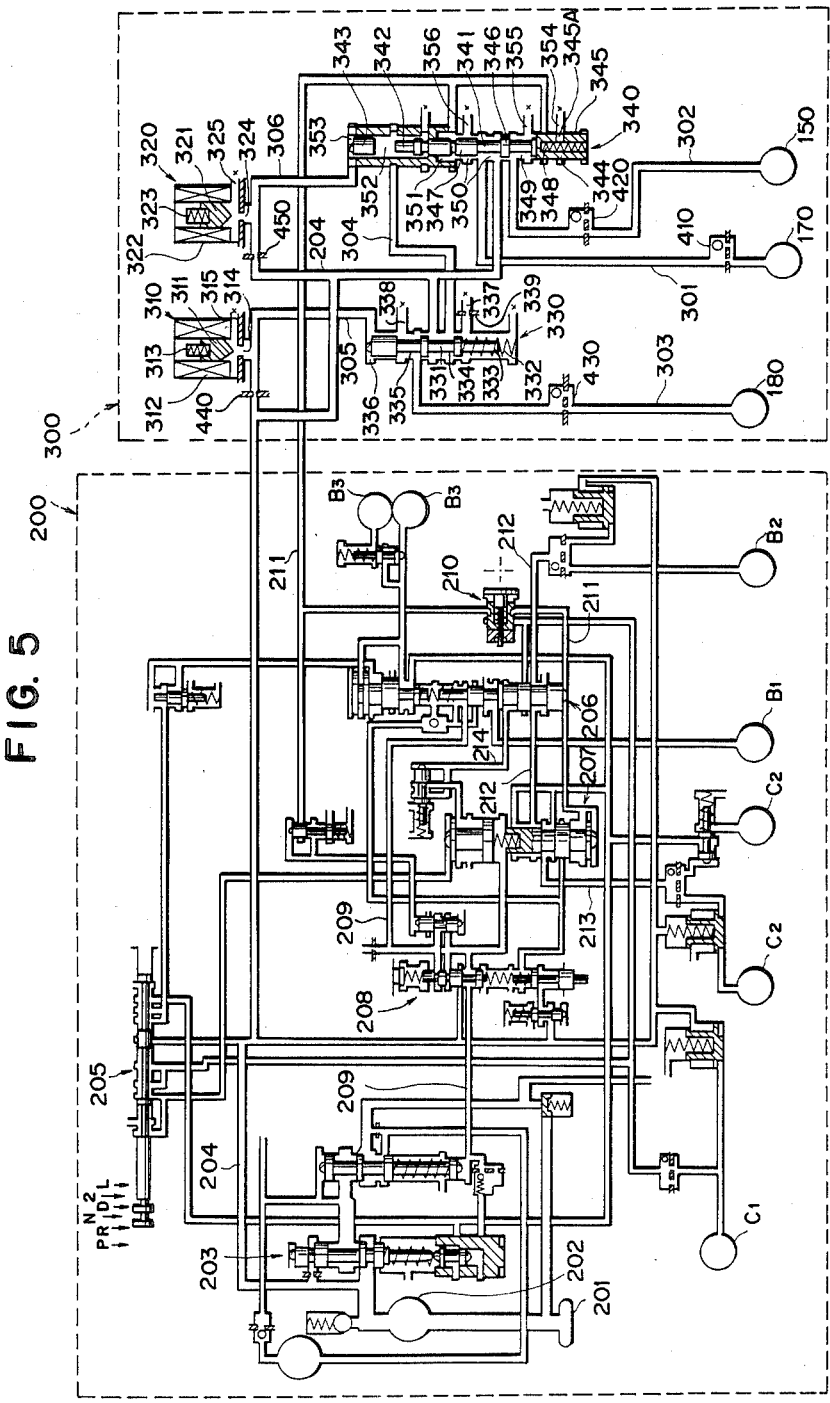
FIG. 5 is a circuit diagram of a hydraulic control system for a four-wheel drive torque transfer mechanism according to the present invention, as coupled with an automatic transmission with three forward speed positions and one reverse position.

Referring now to FIG. 5, the hydraulic control system for four-wheel drive torque transfer mechanism according to the present invention is hereafter described more particularly by way of a case where it is connected to an automatic transmission with three forward speed positions and one reverse position.

In the figure, generally designated by the reference numeral 200 is an example of known automatic transmission with three forward speed gears and one reverse gear, in which the oil taken up from an oil sump 201 by an oil pump 202 is regulated to a predetermined pressure (line pressure) at the pump output by a regulator valve 203 and delivered to an oil passage 204. The oil pressure inputted to the passage 204 is fed to a 1-2 shift valve 206 and a 2-3 shift valve 207 through a manual selector valve 205. Indicated at 208 is a throttle valve which generates an oil pressure (throttle pressure) in an oil passage 209 commensurate with the degree of throttle opening. Indicated at 210 is a governor valve which generates an oil pressure (governor pressure) commensurate with the vehicle speed in an oil passage 211.

The 1-2 shift valve 206 and 2-3 shift valve 207 open and close the oil passages 212 and 214 according to the level of the throttle and governor pressures supplied through the oil passage 209 and 211, thereby controlling the supply and discharge of oil pressure to and from the hydraulic servomotors $C_1$, $C_2$, and $B_1$ to $B_3$ of the clutches and brakes.

In the particular embodiment shown, the oil pressure is supplied to the hydraulic servomotor $C_1$ in the forward 1st speed range, to the hydraulic servomotors $C_1$ and $B_2$ in the forward 2nd speed range, to hydraulic servomotors $C_1$, $C_2$ and $B_2$ in the forward 3rd speed range, and to the hydraulic servomotors $C_2$ and $B_3$ in the reverse range.

The hydraulic control system 300 for the four-wheel drive torque transfer mechanism includes a first solenoid valve 310, a second solenoid valve 320, a change-over valve 330, an inhibitor valve 340, a first oil passage 301 communicating with the hydraulic servomotor 170 for the direct-coupling frictional engagement means or the multiple disc clutch 107, a second oil passage 302 communicating with the hydraulic servomotor 150 for the reduced-speed drive frictional engagement means or the multiple disc brake 105, a third oil passage 303 communicating with the hydraulic servomotor 180 for the four-wheel drive frictional engagement means or the multiple disc clutch 108, a fourth oil passage 304 communicating the change-over valve 330 with a predetermined oil chamber of the inhibitor valve 340, check valves 410, 420 and 430 provided in the first to third oil passages, respectively, and oil passage 305 of the first solenoid pressure and oil passage 306 of the second solenoid pressure communicating with oil passage 204 through orifices 440 and 450, respectively.

The first and second solenoid valves 310 and 320 consist of a moving core 311 or 321, a solenoid 312 or 322, a spring 313 or 323, an opening 314 or 324 and a drain port 315 or 325, respectively. Upon energizing the solenoids 312 or 322, the moving cores 311 and 321 are moved in upper positions shown in the drawing to uncover the openings 314 and 324 to drain through the drain ports 315 and 325 the oil pressure in the oil passages 305 and 306 which are partitioned off from oil passage 204 by the orifices 440 and 450, respectively. When the solenoids 312 and 322 are in the de-energized state, the moving cores 311 and 322 are displaced downward from the upper positions of FIG. 5 into the respective lower positions by the action of the springs 313 and 323 to close the openings 314 and 324 to generate a solenoid pressure of high level (line pressure) in the oil passages 305 and 306.

As shown in FIG. 5, the inhibitor valve 340 is provided with three spools 341, 342 and 343 which are designated as first, second and third spools from the lowest. The first spool 341 is provided with a spring-loaded sleeve-like land 345 at its lower end in addition to two lands 346 and 347, and formed with a lower oil chamber 348, first and second intermediate oil chambers 349 and 350 defined between the sleeve-like land 345 and the lands 346 and 347, an oil chamber 351 defined between the first and second spools 341 and 342, an oil chamber 352 defined between the second and third spools 342 and 343, and an upper oil chamber 353. When the first spool 341 of the inhibitor valve 340 is located in an upper position, above the illustrated position in FIG. 4, the lower oil chamber 348 is communicated with the governor pressure oil passage 211 through an oil port 345A in the sleeve-like land 345, the first intermediate oil chamber 349 communicates the line pressure oil passage 204 with the second oil passage 302, and the second intermediate oil chamber 350 communicates the first oil passage 301 with the drain port 356. On the othe hand, when the first spool 341 is held in the lower position shown, the lower oil chamber 348 communicates with the drain port 354 through the oil port 345A in the sleeve-like land 345, the first intermediate oil chamber 349 communicates the second oil passage 302 with the drain port 355, and the second intermediate oil chamber 350 communicates the line pressure oil passage 204 with the first oil passage 301. The oil chamber 351, oil chamber 352 and upper oil chamber 353 are constantly in communication with the governor pressure oil passage 211, the fourth oil passage 304 and the oil passage 306, respectively.

The change-over valve 330 is loaded with a biasing spring 332 as seen in the drawing on the lower end portion of a spool 331 which is provided with three lands, defining, bottom to top, a lower oil chamber 333, a first intermediate oil chamber 334, a second intermediate oil chamber 335 and an upper oil chamber 336 from the lower ones. If the solenoid pressure of high level is applied to the upper oil chamber 336 which is in communication with oil passage 305 of the first solenoid pressure, the spool 331 is displaced downward from the illustrated position in the drawing to assume a lower position, communicating the line pressure oil passage 204 with the third oil passage 303 through the second intermediate oil chamber 335 to supply the line pressure to the hydraulic servomotor 180 of the clutch 108, and communicating the fourth oil passage 304 with a drain port 337 provided with an orifice 339 through the first intermediate oil chamber 334 to drain the oil chamber 352 of the inhibitor valve 340. If the solenoid pressure applied to the upper chamber 336 turns to low level, the spool 331 is displaced into the upper position as shown in the drawing by the action of the spring 332, communicating the line pressure oil passage 204 with the fourth oil passage 304 through the first intermediate oil chamber 334 to supply line pressure to the oil chamber 352 of the inhibitor valve 340, and communicating the third oil passage 303 with a drain port 338 through the second intermediate chamber 335 to drain the hydraulic servo 180.

If the range of $H_2$ of $H_4$ or $L_4$ is selected by manipulation of a manual shift (a selector switch in this particular embodiment) which is provided in the driver's cabin, the first and second solenoid valves 310 and 320 are turned on or off as shown in Table 2 by the operation of an electric control circuit which will be described hereinafter, selectively supplying the operating oil pressure from the hydraulic control system of the torque transfer mechanism to the hydraulic servomotors 150, 170 and 180 of the respective frictional engagement means to change the transfer mechanism 110 into the gear position of the selected mode ($H_2$ or $H_4$ or $L_4$). In the above-described hydraulic circuit arrangement, if the first solenoid valve 310 is turned on, the transfer mechanism 110 is set in the gear position of $H_2$ mode irrespective of the on- or off-state of the second solenoid valve 320.

Table 2 below shows the on- and off-states of the first and second solenoid valves 310 and 320 in relation with the selected range of manual shift and the transfer gear position, wherein the symbol "ON" and "OFF" represent the energization and de-energization of the solenoid valve, respectively.

TABLE 2

| Manual valve Selected range | Transfer manual shift | Solenoid valve 310 | Solenoid valve 320 | Gear position |
|---|---|---|---|---|
| D.2.L | $H_2$ range | ON | OFF | $H_2$ |
|  | $H_4$ range | OFF | OFF | $H_4$ |
|  | $L_4$ range | OFF | ON | $H_4/L_4$ |
| N.P. | $H_2$ range | ON | OFF | $H_2$ |
|  | $H_4$ range | ON | OFF | $H_2$ |
|  | $L_4$ range | ON | ON | $H_2$ |

As clear from Table 2, upon energization of the first solenoid valve 310, the line pressure which is led from oil passage 204 to oil passage 305 through orifice 440 is drained through the drain port 315 to hold the spool 331 of the change-over valve 330 in the upper position shown, so that the oil pressure in the hydraulic servomotor 180 of the multiple disc clutch 108 is drained through the drain port 338 to release the clutch 108. The release of the multiple disc clutch 108 results in disconnection of the first output shaft 71 from the sleeve 109 (See FIG. 3), namely, disconnection of the first output shaft 71 from the second output shaft 61, putting the transfer mechanism in the gear position of two-wheel drive mode. At the same time, the line pressure from oil passage 204 is applied to the oil chamber 352 of the inhibitor valve 340 through the oil chamber 334 and the fourth oil passage 304 to shift the first and second spools 341 and 342 of the inhibitor valve 340 into the respective lower positions shown, so that the line pressure of oil passage 204 is fed to the hydraulic servomotor 170 through the oil chamber 350, first oil passage 301 and check valve 410 to engage the multiple disc clutch 107, while the oil pressure in the hydraulic servomotor 150 is drained from the drain port 355 through the oil passage 302 and oil chamber 349 to release the brake 105. As a result, the transfer mechanism 110 is held in the gear position for two-wheel drive direct-coupling.

When the first solenoid valve 310 is in de-energized state, the line pressure of the oil passage 204 is led to the oil passage 305 through orifice 440, however, since the opening 314 of the first solenoid valve 310 is closed, it is admitted into the upper oil chamber 336 of the change-over valve 330, displacing the spool 331 into the lower position. Consequently, the line pressure of the oil passage 204 is fed to the hydraulic servomotor 180 through the second intermediate oil chamber 335, third oil passage 303 and check valve 430 to engage the multiple disc clutch 108. The engagement of the multiple disc clutch 108 connects the first output shaft 71 with the second output shaft 61 through the link mechanism to put the transfer mechanism in the gear position of four-wheel drive direct-coupling range. The communication between the fourth oil passage 304 and 204 is blocked, the line pressure is not led into the oil chamber 352 of the inhibitor valve 340. Under these circumstances, if the second solenoid valve 320 is in the de-energized state, the line pressure of the oil passage 204 is admitted into the upper oil chamber 353 of the inhibitor valve 340 through orifice 450 and oil passage 306 to shift the third spool 343 of the inhibitor valve 340 into the lower position, holding the second and first spools 342 and 341 also in their respective lower positions. Accordingly, the line pressure is fed from the oil passage 204 to the hydraulic servomotor 170 through the oil passage 301 and check valve 410 to engage the multiple disc clutch 107, while the oil pressure in the hydraulic servomotor 150 is drained from the drain port 355 through the oil passage 302 and oil chamber 349 to release the multiple disc brake 105, holding the transfer mechanism 110 in gear the position of $H_4$ (4-wheel drive direct-coupling) range.

If the second solenoid valve 320 is energized with the first solenoid valve 310 in the de-energized state, the line pressure which is fed from the oil passage 204 to oil passage 306 through the orifice 450 is drained through the opening 324 and drain port 355, without being admitted into the upper oil chamber 353 of the inhibitor valve 340. Further, the first solenoid valve 310 is in the de-energized state, so that no line pressure is supplied to the oil chamber 352 from the fourth oil passage 304. The pressure receiving surface at the upper end of the first spool 341 of the inhibitor valve 350, which faces the oil chamber 351, has the same area as the pressure receiving surface at the lower end which faces the lower oil chamber 348. Therefore, in a case where the first spool 341 is in the lower position shown, namely, in the gear position of $H_4$ (4-wheel drive direct-coupling) range where the multiple disc clutch 107 is in the engaged state and the multiple disc brake 105 is in the released state, the first spool 341 is continuedly held in the lower position overcoming the force of the spring 344 to maintain the transfer mechanism in the gear position of $H_4$ (4-wheel drive direct coupling) range as long as the governor pressure supplied to the oil chamber 351 from the oil passage 211 is greater than a predetermined level. However, if the governor pressure drops below the predetermined value, the first spool 341 is shifted into the upper position by the action of the spring 344, so that the governor pressure from the oil passage 211 is also admitted into the lower oil chamber 348 through the oil port 345A of the sleeve-like land 345, retaining the first spool 341 in the upper position irrespective of variations in the governor pressure (i.e., in the vehicle speed) thereafter. With the first spool 341 held in the upper position, the line pressure in oil passage 204 is fed to the hydraulic servomotor 150 through the oil chamber 349, second oil passage 302 and check valve 420 to engage the multiple disc brake 105, while the oil pressure in the hydraulic servomotor 170 is drained through oil passage 301, oil chamber 350 and drain port 356 to release the multiple disc clutch 107. Consequently, the transfer mechanism 110 is held in the gear position of $L_4$ range (reduced-speed four-wheel drive mode).

Namely, if the second solenoid valve 320 is energized when the first solenoid valve 310 is de-energized and the governor pressure or the vehicle speed is lower than a predetermined value, the transfer mechanism 110 is immediately changed into the gear position of $L_4$ range (reduced-speed four-sheel drive mode). However, if the second solenoid valve 320 is energized when the governor pressure or the vehicle speed is higher than the predetermined value, the transfer mechanism 110 retains the gear position of $H_4$ (four-wheel drive direct-coupling) range until the governor pressure becomes lower than the predetermined value, and the transfer mechanism 110 is changed into the gear position of $L_4$ range after the governor pressure drops below the predetermined value.

Now, the operations are described in connection with the respective ranges which are selected by the manual valve 205 of the automatic transmission and the manual shift of the transfer mechanism.

(1) Where the manual valve 205 in D-, 2-, L- or R- range position, in which the governor pressure commensurate with vehicle speed is fed to the valve means:

(A) When the manual shift is in $H_2$ range and the transfer mechanism is in the gear position of $H_2$ range (two-wheel drive direct-coupling mode),
 the 1st solenoid valve 310 is "ON", and
 the 2nd solenoid valve 320 is "OFF"
so that the line pressure in oil passage 204 which is led to oil passage 305 through orifice 440 is drained by the de-energized first solenoid valve 310, without being admitted into the upper oil chamber 336 of the change-over valve 330. Therefore, the spool 331 of the change-over valve 330 is held in the upper position by the spring 332, and the line pressure from oil passage 204 is applied to the oil chamber 352 through the oil chamber 334 and fourth oil passage 304, holding the second and first spools 342 and 341 of the inhibitor valve 340 in the respective lower positions. Consequently, the line pressure is fed to the hydraulic servomotor 170 of the clutch 107 from the oil passage 204 through the oil chamber 350, first oil passage 301 and check valve 410, while the oil pressures in the hydraulic servomotors 180 and 150 are drained through the drain ports 338 and 355, respectively. Thus, the transfer mechanism 110 is set in the gear position of $H_2$ range (two-wheel drive direct-coupling mode).

(B) When the manual shift is in $H_4$-range and the transfer mechanism is in the gear position of $H_4$ range (four-wheel drive direct-coupling mode),
 the 1st solenoid valve 310 is "OFF", and
 the 2nd solenoid valve 320 is "OFF"
so that the line pressure in the oil passage 204 is led to the oil passage 305 through orifice 440. However, since the first solenoid valve 310 is in de-energized state, the line pressure is admitted into the upper oil chamber 336 of the change-over valve 330, holding the spool 331 in the lower position. Consequently, the line pressure from the oil passage 204 is fed to the hydraulic servomotor 180 of the clutch 108 through the second intermediate oil chamber 335, check valve 430 and third oil passage 303. On the other hand, the line pressure which is also led to the oil passage 306 from the oil passage 204 through orifice 450 is admitted into the upper oil chamber 353 since the second solenoid valve 320 is in de-energized state, holding the third, second and first spools 343, 342 and 341 of the inhibitor valve 340 in the respective lower positions. Therefore, the line pressure is fed to the hydraulic servomotor 170 of the clutch 107, and the oil pressure in the hydraulic servomotor 150 is drained through the drain port 355. Thus, the transfer mechanism 110 is set in the gear position of $H_4$ range (four-wheel drive direct-coupling mode).

(C) When the manual shift is in $L_4$-range with a vehicle speed higher than a predetermined value, and the transfer mechanism is in the gear position of $H_4$ range (four-wheel drive direct-coupling mode),
 the 1st solenoid valve 310 is "OFF", and
 the 2nd solenoid valve 320 is "ON"
so that the line pressure of the oil passage 204 which is led into the oil passage 305 through orifice 440 prevails in the upper oil chamber 336 since the first solenoid valve 310 is in de-energized state, holding the spool 331 of the change-over valve 330 in the lower position. Accordingly, the line pressure is fed to the hydraulic servomotor 180 of the clutch 108. On the other hand, the line pressure which is also led into the oil passage 306 from the oil passage 204 through the orifice 450 is drained by the energized second solenoid valve 320, so that it is not admitted into the upper oil chamber 353 of the inhibitor valve 340. Also, the line pressure is not fed into the oil chamber 352 because the spool 331 of the change-over valve 330 is in the lower position. As the governor pressure prevails in the oil chamber 351, the second and third spools 342 and 343 are shifted to their respective upper positions. The governor pressure is in excess of the predetermined level, so that the first spool 341 is held in the lower position shown, overcoming the force of the spring 344. Therefore, the line pressure is fed to the hydraulic servomotor 170 of the clutch 107, and the oil pressure in the hydraulic servomotor 150 is drained through the drain port 355. Thus, the transfer mechanism 110 is set in the gear position of $H_4$ range (four-wheel drive direct-coupling mode).

(D) When the manual shift is in $L_4$-range with a vehicle speed lower than the predetermined value and the transfer mechanism is in the gear position of $L_4$ range (reduced-speed four-wheel drive mode),
 the 1st solenoid valve 310 is "OFF", and
 the 2nd solenoid valve 320 is "ON"
so that the line pressure which is led from the oil passage 204 into the oil passage 305 through orifice 440 is admitted into the upper oil chamber 336 since the first solenoid valve 310 is in de-energized state, setting the spool 331 of the change-over valve 330 in the lower position shown. Consequently, the line pressure is fed into the hydraulic servomotor 180 of the clutch 108. On the other hand, the line pressure which is also led from the oil passage 204 to the oil passage 306 through orifice 450 is drained by the energized second solenoid valve 320. The line pressure is thus not admitted into the upper oil chamber 353 of the inhibitor valve 340. Also the line pressure is not fed into the oil chamber 352. In this instance, the governor pressure prevails in the oil chamber 351, the second and third spools 342 and 343 are shifted to their respective upper positions, and, since the governor pressure is lower than the predetermined level and overcome by the force of the spring 344, the first spool 341 is held in the upper position, admitting the governor pressure into the lower oil chamber 348 through the oil port 345A in the sleeves. Therefore, the line pressure is fed to the hydraulic servomotor 150 of the multiple disc brake 105 from the oil passage 204 through oil chamber 349, second oil passage 302 and check valve 420, while the oil pressure in the hydraulic servomotor 170 is drained through the first oil passage 301, second intermediate oil chamber 350 and drain port 356. Thus, the transfer mechanism is set in the position of $L_4$ range (reduced-speed four-wheel drive mode).

The upper and lower end faces of the first spool 341 of the inhibitor valve 340, which face respectively the oil chamber 351 and lower oil chamber 348, have the same pressure receiving areas, so that when the spool is shifted to the upper position, admitting the governor pressure into both the oil chamber 351 and the lower oil chamber 348, it will not be shifted to the lower position and will be held in the upper position by the action of the spring 344 even if the governor pressure (or the vehicle speed) is increased, until the manual shift is set in the $H_2$- or $H_4$-range position to admit the line pressure into the oil chamber 352 or into the upper oil chamber 353. Therefore, in a case where the $L_4$-range is selected by the manual shift and established the gear position of $L_4$ range of the transfer mechanism upon a drop of the vehicle speed (or governor pressure) below a predetermined value, that gear position of $L_4$ range is maintained even after the vehicle speed (or governor pressure) is increased.

(2) Where the manual valve 205 in N- or P- range in which no governor pressure is fed to the valve means:

(E) When the manual shift selects $L_4$ range,
the 1st solenoid valve 310 is "ON", and
the 2nd solenoid valve 320 is "ON"

so that the line pressure which is led from the oil passage 204 to the oil passage 305 through orifice 440 is drained by the energized first solenoid valve 310, supplying no line pressure to the upper oil chamber 336. Therefore, the spool 331 of the change-over valve 330 is held in the upper position by the action of the spring 332, applying the line pressure to the oil chamber 352 of the inhibitor valve 340 from the oil passage 204 through the oil chamber 334 and the fourth oil passage 304, setting the second and first spools 342 and 341 of the inhibitor valve 340 in their respective lower positions. Consequently, the line pressure is fed to the hydraulic servomotor 170 of the clutch 107, and the oil pressure in the hydraulic servomotors 180 and 150 is drained through the drain ports 338 and 355, respectively. Thus, the transfer mechanism 110 is set in the gear position of $H_2$ range (two-wheel drive direct-coupling mode).

(F) When the manual shift selects $H_2$ range, or
(G) When the manual shift selects $H_4$ range,
the 1st solenoid valve 310 is "ON", and
the 2nd solenoid valve 320 is "OFF"

so that the line pressure is admitted into the upper oil chamber 353 of the inhibitor valve 340 in addition to the conditions in (E). However, the change-over valve 330 and inhibitor valve 340 are operated in the same manner, supplying the line pressure to the hydraulic servomotor 170 of the clutch 107 and draining the hydraulic servomotors 150 and 180 to set the transfer mechanism in the gear position of $H_2$ range.

With the above-described transfer mechanism, if the range of reduced-speed four-wheel drive mode is selected by the manual shift of the transfer mechanism during a high speed operation of the vehicle in the mode of two-wheel drive direct-coupling mode ($H_2$) or four-wheel drive direct-coupling mode ($H_4$), the first and second solenoid valves 310 and 320 are put in a de-energized state and energized state, respectively, as shown in Table 2. However, during the high speed operation of the vehicle in $H_2$ or $H_4$ mode, the second solenoid valve 320 has been in a de-energized state with its first spool 341 held in the lower position, so that even if the oil pressure in the upper oil chamber 353 is drained upon energization of the second solenoid valve 320, the governor pressure in the oil chamber 351 holds the spool 341 continuatively in the lower position, overcoming the force of the spring 344 as long as the vehicle speed is higher than the predetermined value. Therefore, the transfer mechanism is maintained in the gear position of $H_4$ range and not changed into $L_4$ range until the governor pressure drops below the predetermined level.

However, in a high speed operation of the vehicle where the transfer mechanism is established in $H_4$ range, if the manual shift of the automatic transmission is set in D-range after once setting the same in N-range in which the feeding of the governor pressure is stopped, the governor pressure which has been prevailing in the oil chamber 351 of the inhibitor valve 340 is drained at the time when the manual shift is set in the N-range position, as a result shifting the spool 341 to the upper position by the action of the spring 344. As soon as the manual shift is set in the D-range position, the governor pressure is admitted into the oil chamber 351 as well as the lower oil chamber 348 through the oil port 345A in the sleeve-like land to hold the spool 341 in the upper position. In such a case, the transfer mechanism 110 is changed into the gear position of reduced-speed four-wheel drive range $L_4$, abruptly changing the mode of operation of the vehicle to reduced speed four-wheel during operation abruptly from a high speed driving operation in $H_4$ range.

In order to avoid such dangerous situations, the electric control circuit employed by the present invention includes means for supplying the first solenoid valve 310 with a signal indicative of the selection of N- or P-range by the manual shift of the automatic transmission, thereby holding the first solenoid valve 310 in an energized state to feed the line pressure to the hydraulic servomotor 170 of the multiple disc clutch 107 irrespective of the mode selected by the manual shift of the transfer mechanism, as will be described in greater detail hereinafter.

Figure 6:
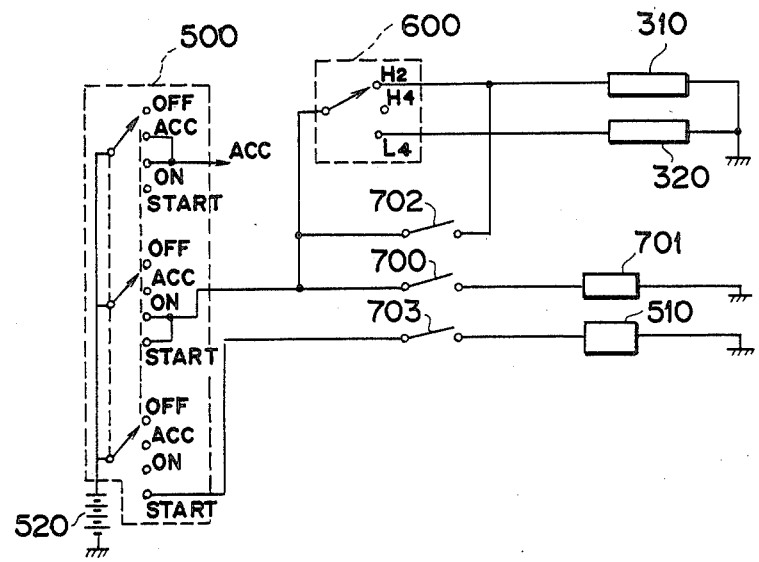
FIG. 6 is a diagram of an electric circuit for the control of the hydraulic control system.
Figure 7:
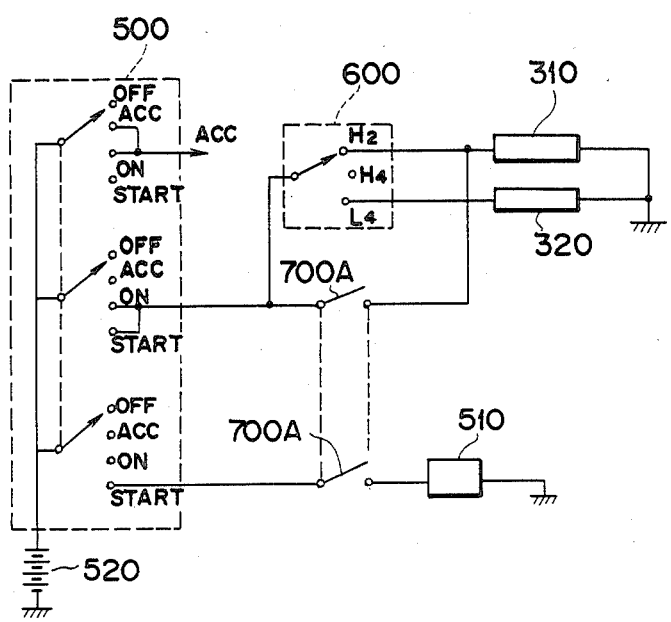
FIG. 7 is a view similar to FIG. 5 but showing another electric control circuit.

FIGS. 6 and 7 illustrate Example 1 and 2, respectively, of the electric circuit which energizes and de-energizes the first and second solenoid valves 310 and 320 as shown in Table 2 according to the selected range selected by the manual selector valve 205 of the automatic transmission and the mode of operation selected by the manual shift of the transfer mechanism 110.

EXAMPLE 1

The electric circuit includes an ignition switch 500, a starter motor 510, a battery 520 and a manual shift or a selector switch 600 for the transfer mechanism 110. Indicated at 700 is a neutral safety switch which permits starting the internal combustion engine only in N- and P-ranges of the automatic transmission, and is turned on by the shift lever of the automatic transmission when the N- or P-range is selected thereby, actuating a relay 701 and closing relay contacts 702 and 703 to energize ("ON") the first solenoid valve 310 irrespective of the mode of operation ($H_2$-mode, $H_4$-mode and $L_4$-mode) selected by the selector switch 600.

EXAMPLE 2

In this case, the relay 701 and relay contacts 702 and 703 are omitted by the use of a safety switch 700A for two circuits.

In these embodiments, the oil passage 204 extends via the line pressure oil passage 34 while the oil passage 211 extends via the governor pressure oil passage 35.

We claim:

1. A four-wheel drive automatic transmission comprising:
   an automatic transmission having:
      a transmission case including a first end face;
      a transmission mechanism mounted in the transmission case, and
      an automatic transmission hydraulic control unit including:
         a transmission valve body secured to the bottom surface of the transmission case; and
         a first flow passage for working hydraulic fluid for operating said transmission mechanism, said first flow passage cast in and extending through a wall of said transmission case and opening to the exterior of said transmission case at said first end face, said first flow passage defining a path, inside said transmission case, for fluid communication between said transmission valve body and said first end face;
   a four-wheel drive transfer unit having:
      a transfer case including a second end face directly abutting said first end face of the transmission case to define a planar interface therebetween,
      a transfer mechanism mounted in the transfer case, and,
      a transfer hydraulic control unit, including:
         a transfer valve body secured to the bottom surface of the transfer case;
         a second flow passage, inside said transfer case, for the working hydraulic fluid supplied to said transfer valve body, said second flow passage cast in and extending through a wall of said transfer case and opening to the exterior of said transfer case at said second end face where said second flow passage connects with said first flow passage to establish a continuous flow path within said housings for fluid communication between said transmission valve body and said transfer valve body; and
   oil seal means between said end faces and surrounding the connected flow passages.

* * * * *